US009575953B2

(12) United States Patent
Ando et al.

(10) Patent No.: US 9,575,953 B2
(45) Date of Patent: Feb. 21, 2017

(54) NATURAL-LANGUAGE PROCESSING SYSTEM AND DICTIONARY REGISTRATION SYSTEM

(75) Inventors: Shinichi Ando, Tokyo (JP); Kunihiko Sadamasa, Tokyo (JP); Shinichi Doi, Tokyo (JP)

(73) Assignee: NEC Corporation, Tokyo (JP)

( * ) Notice: Subject to any disclaimer, the term of this patent is extended or adjusted under 35 U.S.C. 154(b) by 1284 days.

(21) Appl. No.: 12/310,773

(22) PCT Filed: Sep. 6, 2007

(86) PCT No.: PCT/JP2007/067416
§ 371 (c)(1),
(2), (4) Date: Mar. 6, 2009

(87) PCT Pub. No.: WO2008/029881
PCT Pub. Date: Mar. 13, 2008

(65) Prior Publication Data
US 2009/0281786 A1    Nov. 12, 2009

(30) Foreign Application Priority Data

Sep. 7, 2006 (JP) .................................. 2006-242519

(51) Int. Cl.
*G06F 17/20* (2006.01)
*G06F 17/28* (2006.01)
(Continued)

(52) U.S. Cl.
CPC ........... *G06F 17/2735* (2013.01); *G06F 17/20* (2013.01); *G06F 17/2223* (2013.01); *G10L 13/00* (2013.01);
(Continued)

(58) Field of Classification Search
USPC .................... 704/1–10, E11.001–E11.007
See application file for complete search history.

(56) References Cited

U.S. PATENT DOCUMENTS 4,641,264 A * 2/1987 Nitta et al. .................. 704/4
5,010,486 A * 4/1991 Suzuki et al. ................ 704/5
(Continued)

FOREIGN PATENT DOCUMENTS

JP    06-314274       11/1994
JP    10-260984 A     9/1998
(Continued)

OTHER PUBLICATIONS

Translation Adapter-II Crossroad Ver. 3 Handbook, 1999, pp. 134-135.
(Continued)

*Primary Examiner* — Pierre-Louis Desir
*Assistant Examiner* — David Kovacek
(74) *Attorney, Agent, or Firm* — Foley & Lardner LLP (57) ABSTRACT

A natural-language processing system includes a registration-candidate storage section that stores therein registration-candidate dictionary data, a judgment means that compares input data against the registration-candidate dictionary data to thereby judge whether or not the input data includes a word corresponding to the registration-candidate dictionary data, an inquiry means that inquires to a user whether or not corresponding dictionary data is to be registered in a dictionary storage section to accept a user's instruction if it is judged that a corresponding word exists, a dictionary registration means that registers the corresponding dictionary data in the dictionary storage section based on the input instruction, and a natural-language processing means that executes a natural-language processing onto the input data by using the dictionary data registered in the dictionary storage section.

28 Claims, 5 Drawing Sheets

(51) Int. Cl.
  *G06F 17/27* (2006.01)
  *G06F 17/22* (2006.01)
  *G10L 13/00* (2006.01)
  *G10L 15/26* (2006.01)

(52) U.S. Cl.
  CPC .......... *G10L 15/26* (2013.01); *G06F 17/2795* (2013.01); *G06F 17/2845* (2013.01)

(56) References Cited

U.S. PATENT DOCUMENTS

| | | | | |
|---|---|---|---|---|
| 5,029,084 | A | * | 7/1991 | Morohasi et al. ............... 704/9 |
| 5,295,068 | A | * | 3/1994 | Nishino et al. ............... 704/10 |
| 5,321,801 | A | | 6/1994 | Ando ............................ 715/205 |
| 5,497,319 | A | * | 3/1996 | Chong et al. .................... 704/2 |
| 5,526,259 | A | * | 6/1996 | Kaji ................................ 704/3 |
| 5,579,224 | A | * | 11/1996 | Hirakawa et al. ............... 704/2 |
| 5,649,221 | A | | 7/1997 | Crawford et al. ............ 715/234 |
| 5,701,497 | A | * | 12/1997 | Yamauchi et al. ............... 704/3 |
| 5,742,834 | A | * | 4/1998 | Kobayashi ..................... 704/10 |
| 5,742,926 | A | * | 4/1998 | Yumura et al. ................... 704/2 |
| 5,768,451 | A | * | 6/1998 | Hisamitsu et al. ........... 382/309 |
| 5,867,812 | A | * | 2/1999 | Sassano .......................... 704/10 |
| 5,924,068 | A | * | 7/1999 | Richard ................. H04N 7/088 |
| | | | | 345/901 |
| 5,960,449 | A | * | 9/1999 | Nagaoka et al. ............. 715/223 |
| 5,983,171 | A | * | 11/1999 | Yokoyama et al. ........... 704/10 |
| 6,029,123 | A | * | 2/2000 | Suda et al. ........................ 704/9 |
| 6,081,774 | A | * | 6/2000 | de Hita et al. .................... 704/9 |
| 6,085,162 | A | * | 7/2000 | Cherny ......................... 704/277 |
| 6,385,339 | B1 | * | 5/2002 | Yokota et al. ................. 382/181 |
| 6,401,060 | B1 | | 6/2002 | Critchlow et al. ............... 704/1 |
| 6,507,678 | B2 | * | 1/2003 | Yahagi .......................... 382/305 |
| 6,789,057 | B1 | * | 9/2004 | Morimoto ............ G06F 17/271 |
| | | | | 704/2 |
| 7,016,895 | B2 | * | 3/2006 | Dehlinger et al. ........... 707/750 |
| 7,254,530 | B2 | * | 8/2007 | Klavans et al. ............... 704/10 |
| 7,809,562 | B2 | * | 10/2010 | Hanazawa .................... 704/246 |
| 2002/0065647 | A1 | * | 5/2002 | Hatori et al. ..................... 704/2 |
| 2002/0082831 | A1 | * | 6/2002 | Hwang ................. G10L 15/063 |
| | | | | 704/249 |
| 2003/0233226 | A1 | * | 12/2003 | Kim et al. ........................ 704/4 |
| 2003/0233615 | A1 | * | 12/2003 | Morimoto ............... G06F 3/018 |
| | | | | 715/259 |
| 2004/0030543 | A1 | * | 2/2004 | Kida et al. ........................ 704/8 |
| 2004/0133417 | A1 | * | 7/2004 | Azuma ............................ 704/8 |
| 2004/0138872 | A1 | * | 7/2004 | Nir ................................ 704/10 |
| 2004/0181391 | A1 | * | 9/2004 | Inoue et al. .................... 704/10 |
| 2005/0108001 | A1 | * | 5/2005 | Aarskog ........................ 704/10 |
| 2006/0015326 | A1 | * | 1/2006 | Mori et al. ....................... 704/9 |
| 2006/0241936 | A1 | * | 10/2006 | Katae .............................. 704/6 |
| 2007/0038436 | A1 | * | 2/2007 | Cristo et al. ..................... 704/9 |
| 2007/0055496 | A1 | * | 3/2007 | Seto ................................. 704/9 |
| 2007/0174041 | A1 | * | 7/2007 | Yeske .............................. 704/3 |
| 2007/0179779 | A1 | * | 8/2007 | Kagoshima et al. ........... 704/10 |
| 2007/0294079 | A1 | * | 12/2007 | Ishikura et al. .................. 704/3 |
| 2009/0281786 | A1 | * | 11/2009 | Ando et al. ...................... 704/2 |

FOREIGN PATENT DOCUMENTS

| | | |
|---|---|---|
| JP | 2003-157257 A | 5/2003 |
| JP | 3464881 B | 8/2003 |

OTHER PUBLICATIONS

English Translation of the International Preliminary Report on Patentability (issued in International Application No. PCT/JP2007/067416) dated Apr. 16, 2009, 5 pages.

Office Action issued in Japanese application No. 2008-533198 with partial English translation; issued Jun. 26, 2012; 5 pages.

* cited by examiner

| Japanese | English | Part of Speech | Out-of-Registration-Target |
|---|---|---|---|
| ジーン | gene | noun | — |
| 遺伝子診断 | genetic diagnosis | noun | out of target |
| トランスポゾン | transposon | noun | — |

NATURAL-LANGUAGE PROCESSING SYSTEM AND DICTIONARY REGISTRATION SYSTEM

TECHNICAL FIELD

The present invention relates to a technique for processing of natural language by using language information stored in a dictionary and, more particularly, to a natural-language processing system which is capable of updating the dictionary with ease and a dictionary registration system used in such a system.

BACKGROUND ART

Natural-language processing systems, such as kana-kanji conversion, machine translation, speech recognition and voice synthesis systems, operate a processing fundamentally based on the words stored in a dictionary and the linguistic information provided therein. Thus, it is difficult to appropriately process a word not stored in the dictionary, i.e., an unknown word. On the other hand, since the natural language changes day by day, there occur a new word and a new usage even in a known word, whereby it is generally difficult to store in advance all these words in the dictionary. Thus, this problem has been coped with heretofore by providing a user dictionary function by which each user can individually register a word needed by the each user.

Registration operation for a dictionary is a work that burdens a lot on the user. For this reason, methods of sharing the dictionary data which each user registered among the users have been proposed for the purpose of cost saving for the dictionary registration.

For example, Non-Patent Document-1 describes a method of releasing to the public on a dedicated Web page an updated dictionary or user dictionaries that the individual users prepared, thereby allowing the individual users to utilize the same. However, there is a problem in this technique that the individual users cannot directly know whether or not the dictionary that is useful to the users is released to open unless the users monitor the homepage at any time.

Patent Publication-1 describes a technique wherein individual users inspect in a cross-sectional manner the dictionary data registered by other users, to extract dictionary data that are registered in common in the user dictionaries of a plurality of users, and to reflect the extracted dictionary data, as the dictionary data to be shared, in the user dictionaries of all the users.

Patent Publication-2 describes a technique of providing a mechanism for managing individual user dictionaries in association with a specific technical terminology dictionary, wherein individual users inspect in a cross-sectional manner the dictionary data registered in the individual user dictionaries by the users, to extract the dictionary data registered in a plurality of user dictionaries in association with the same technical terminology dictionary, and to reflect the dictionary data in the technical terminology dictionary as the dictionary data to be shared, thereby allowing the dictionary data to be shared among a plurality of users.

In the above techniques, if the dictionary data that is automatically extracted is registered in the dictionary, it may rather incur degradation of the accuracy in the natural-language processing for a specific user. This is because, even if the extracted data may be useful to a majority of users, the extracted data is not always useful to another user. This is also because registration of the dictionary data including needless words increases the probability of leading the natural-language processing to a misjudging. Thus, Patent Publication-2 and Patent Publication-3 describe techniques of immediately informing to individual users that new dictionary data is registered in a common dictionary and inquiring whether or not the users use the dictionary data. These techniques are intended to prevent mixing of inappropriate data into the individual user dictionaries, by immediately informing the users that the new dictionary data is available and allowing the user to finally judge whether or not the dictionary data is to be used.

Non-Patent Document-1: NEC Corp., "TRANSLATION ADAPTER-II CROSSROAD Ver. 3 HANDBOOK", 1999, P. 134-135

Patent Publication-1: JP-3464881B

Patent Publication-2: JP-2003-157257A

The first problem in the conventional techniques is that it is difficult for the individual users to judge the dictionary data to be useful or needless. This is because the users cannot judge whether or not the dictionary data of a word that the users do not use at that present may be useful in the future including the possibility.

The second problem is that, although the conventional techniques notify the user of the dictionary data as needed and inquire whether or not the dictionary data is to be registered, this fact itself hampers the user's action. This is because the notification and inquiry in the conventional techniques is performed without consideration of the schedule of the users that receive the notification and inquiry.

SUMMARY OF THE INVENTION

It is an object of the present invention to provide a natural-language processing system that is capable of allowing the user to judge with ease presence or absence of need for the individual dictionary data.

It is another object of the present invention to provide a natural-language processing system that is capable of notifying and inquiring the presence or absence of need for the dictionary data without hampering the user's action.

The present invention provides a natural-language processing system that executes a natural-language processing onto input data, including: a registration-candidate storage section that stores therein registration-candidate dictionary data; a judgment means that compares the input data against the registration-candidate dictionary data, to judge whether or not the input data includes a word corresponding to the registration-candidate dictionary data; an inquiry means that inquires to a user whether or not the registration-candidate dictionary data is to be registered in a dictionary storage section, to thereby accept a user's instruction, if the judgment means judges that the corresponding word exists; a dictionary registration means that registers the registration-candidate dictionary data in the dictionary storage section based on the instruction input to the inquiry means; and a natural-language processing means that executes a natural-language processing onto the input data by using the dictionary data registered in the dictionary storage section.

The present invention provides a dictionary registration system including: a registration-candidate storage section that stores therein registration-candidate dictionary data; a judgment means that compares input data against the registration-candidate dictionary data to thereby judge whether or not the input data includes a word corresponding to the registration-candidate dictionary data; an inquiry means that inquires to a user whether or not the registration-candidate dictionary data is to be registered in a dictionary storage section to accept a user's instruction, if the judgment means judges that the corresponding word exists; and a dictionary registration means that registers the registration-candidate dictionary data in the dictionary storage section based on the instruction input to the inquiry means.

The present invention provides a natural-language processing method including: comparing input data against registration-candidate dictionary data stored in a storage unit, to thereby judge whether or not the input data includes a word corresponding to the registration-candidate dictionary data; inquiring to a user whether or not the registration-candidate dictionary data is to be registered in a dictionary to accept a user's instruction, if it is judged that the corresponding word exists; registering the registration-candidate dictionary data in the dictionary based on the input instruction; and executing a natural-language processing onto the input data by using the dictionary data registered in the dictionary.

The present invention provides a dictionary registration method including: comparing input data against registration-candidate dictionary data stored in a storage unit to thereby judge whether or not the input data includes a word corresponding to the registration-candidate dictionary data; inquiring to a user whether or not the registration-candidate dictionary data is to be registered in a dictionary to accept a user's instruction, if it is judged that the corresponding word exists; and registering the registration-candidate dictionary data in the dictionary. based on the input instruction.

The present invention provide a recording medium encoded with a computer-readable program that causes a central processing unit (CPU) to operate, the program causes the CPU to execute the processings of: storing registration-candidate dictionary data in a storage unit; comparing input data against the registration-candidate dictionary data, and thereby judging whether or not the input data includes a word corresponding to the registration-candidate dictionary data; inquiring to a user whether or not the registration-candidate dictionary data is to be registered in a dictionary to accept a user's instruction, if the judging processing judges that the corresponding word exists; registering the registration-candidate dictionary data in the dictionary based on an instruction input in the inquiring processing; executing a natural-language processing onto the input data by using the dictionary data registered in the dictionary.

The present invention provides a recording medium encoded with a computer-readable program that causes a central processing unit (CPU) to operate, the program causes the CPU to execute the processings of: storing registration-candidate dictionary data; comparing input data against the registration-candidate dictionary data and judging whether or not the input data includes a word corresponding to the registration-candidate dictionary data; inquiring to a user whether or not the registration-candidate dictionary data is to be registered in a dictionary, to accept a user's instruction, if the judgment processing judges that the corresponding word exists; and registering the registration-candidate dictionary data in the dictionary based on an instruction input in the inquiry processing.

The above and other objects, features and advantages of the present invention will be more apparent from the following description referring to the accompanying drawings.

BEST MODE OF CARRYING OUT THE INVENTION

A natural-language processing system 10 according to a first exemplary embodiment of the present invention will be described in detail with reference to the drawings.

Figure 1:
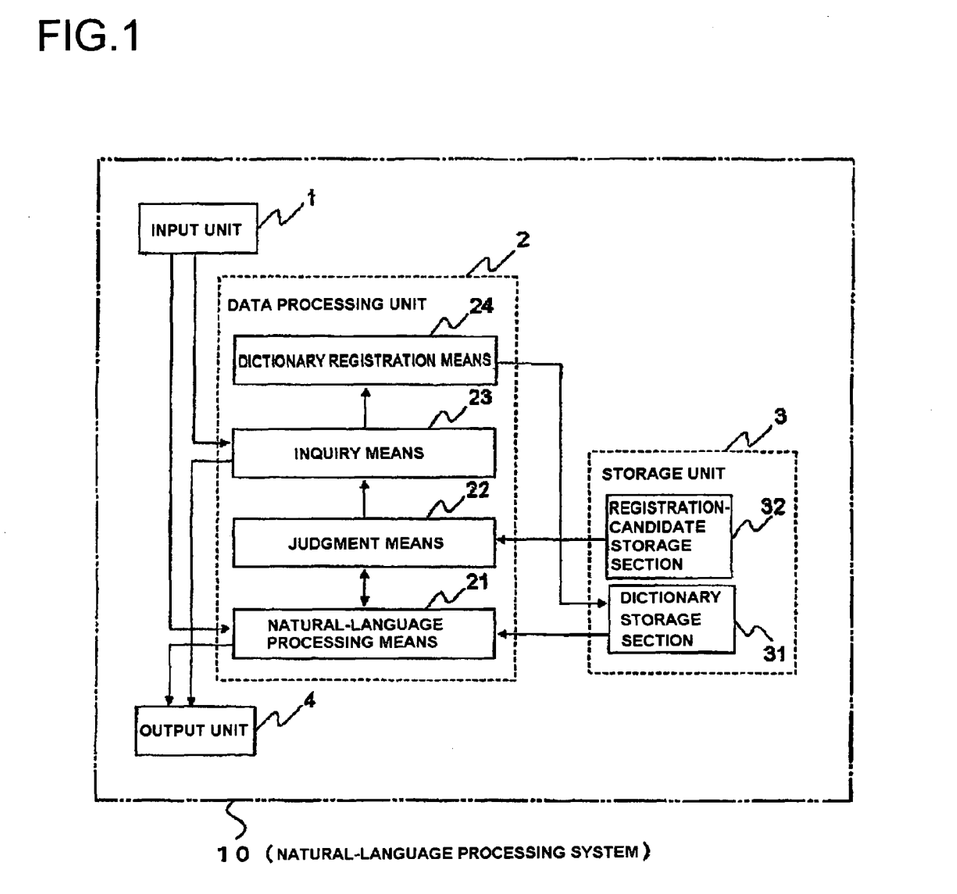
FIG. 1 is a block diagram showing the configuration of a natural-language processing system according to a first exemplary embodiment of the present invention.

With reference to FIG. 1, the natural-language processing system 10 includes input units 1, such as a keyboard and a microphone, a data processing unit 2 that operates under a program control, a storage unit 3 that stores therein information, and output units 4, such as a display unit, a printer and a speaker.

The storage unit 3 includes a dictionary storage section 31 and a registration-candidate storage section 32. The dictionary storage section 31 stores therein individual user dictionaries, each of which includes words and linguistic information corresponding to the words. The linguistic information is information that the natural-language processing means 21 described later refers to for the own processing and includes kana notation, reading, translation, part of speech, semantic information etc. The registration-candidate storage section 32 stores therein registration-candidate dictionary data that is a candidate of dictionary data to be newly registered in each user dictionary. The dictionary data is a minimum unit of the information registered in the dictionary, and consists of a word and linguistic information corresponding to the same.

The data processing unit 2 includes a natural-language processing means 21, a judgment means 22, an inquiry means 23 and a dictionary registration means 24.

The natural-language processing means 21 accepts an input from the user, executes a natural-language processing onto the input data by using the user dictionary stored in the dictionary storage section 31, and outputs a result of the processing. The natural-language processing that the natural-language processing means 21 executes is, for example, a machine-translation processing and/or a voice-synthesis processing. The machine-translation processing is a processing that converts a character string of the input first language into another character string of the second language, whereas the voice-synthesis processing is a processing that converts an input character string into an audio signal. The natural-language processing means 21 outputs the input data to the judgment means 22, prior to executing the natural-language processing onto the input data. The natural-language processing means 21 may have an unknown-word detection function, and does not always output the input data to the judgment means 22, whereby the input data is output to the judgment means 22 only when the unknown word is observed in the input data, to allow the judgment means 22 to operate thereafter.

The judgment means 22 compares the input data input from the natural-language processing means 21 against the words of the dictionary data stored in the registration-candidate storage section 32, to inspect whether or not the input data includes a word (hereinafter referred to as "corresponding word") corresponding to the dictionary data stored in the registration-candidate storage section 32. If a corresponding word is found in the input data, the registration-candidate dictionary data (hereinafter "corresponding dictionary data") corresponding to the corresponding word is output to the inquiry means 23. If a configuration is employed wherein the judgment means 22 executes only when an unknown word is found in the input data, the configuration may be such that upon inspection by the judgment means 22 whether or not a corresponding word exists in the input data, it is judged that the corresponding word is included only when the portion of the input data including the unknown word overlaps a word in the dictionary data.

The inquiry means 23 displays on the output unit 4 the corresponding dictionary data input from the judgment means 22, to thereby inquire the user whether or not the corresponding dictionary data is to be registered in the dictionary. If an input showing "to be registered" is input from the input unit 1, the inquiry means 23 outputs the corresponding dictionary data to the dictionary registration means 24. On the other hand, if an input showing that the registration is unnecessary is input from the input unit 1, the control is returned to the natural-language processing means 21. It is to be noted that if an input showing that the registration is unnecessary is input from the input unit 1, the configuration may be such that the corresponding dictionary data as well as the information that it is out of the registration target is stored in the registration-candidate storage section 32, whereby the same dictionary data is treated as out of the registration target if the same registration data is stored later in the registration-candidate storage section 32.

The dictionary registration means 24 registers in the dictionary the corresponding dictionary data input from the inquiry means 23, and returns the control to the natural-language processing means 21.

Figure 2:
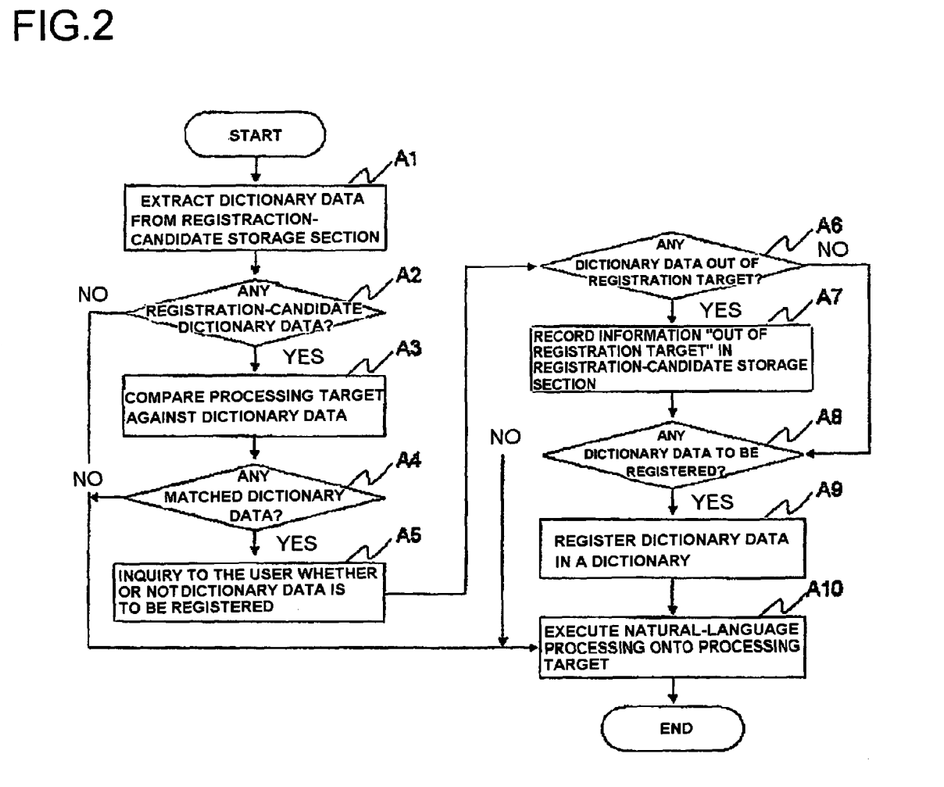
FIG. 2 is a flowchart showing operation of the natural-language processing system of FIG. 1.

Next, with reference to FIG. 1 and the flowchart of FIG. 2, operation of the natural-language processing system 10 will be described in detail.

First, upon receiving an input from the input unit 1, the natural-language processing means 21 outputs to the judgment means 22 the input data thus input, before executing the natural-language processing. The judgment means 22 extracts the registration-candidate dictionary data from the registration-candidate storage section 32, upon receiving the input data from the natural-language processing means 21 (step A1 in FIG. 2).

Subsequently, it is examined whether or not the registration-candidate dictionary data can be extracted and whether or not the dictionary data is out of the registration target if it is extracted, and then presence or absence of a candidate of dictionary data to be registered in the dictionary is investigated (step A2). If there is no candidate of dictionary data to be registered, the natural-language processing means 21 executes a natural-language processing onto the input data, and outputs the result thereof to the output unit 4 (NO in judgment of step A2, and step A10).

If there is a candidate of the dictionary data to be registered, the judgment means 22 compares the input data against each dictionary data (Steps A3 and A4). If there is no corresponding word in the input data, the natural-language processing means 21 executes a natural-language processing onto the input data, and outputs the result thereof to the output unit 4 (NO in judgment of step A4, and step A10).

If t here is a corresponding word included in the input data, the inquiry means 23 displays the dictionary data (corresponding dictionary data) on the output unit 4, to inquire the user whether or not the data is to be registered in the dictionary (step A5). Thereafter, a response to the inquiry is received from the input unit 1, and it is investigated whether or not there is a corresponding dictionary data that is notified as out of the registration target (step A6). If there is a corresponding dictionary data notified as out of the registration target, the inquiry means 23 stores the dictionary data as well as the information that it is out of the registration target in the registration-candidate storage section 32 (step A7).

Thereafter or if there is no dictionary data that is notified as out of the registration target at step A6, it is investigated whether or not there is corresponding dictionary data that is notified to be registered (step A8). If there is corresponding dictionary data that is notified to be registered, the dictionary registration means 23 registers the dictionary data in the dictionary (step A9).

Thereafter or if there is no corresponding dictionary data that is notified to be registered at step A8, the natural-language processing means 21 executes a natural-language processing onto the input data by using the dictionary stored in the dictionary storage section 31, and outputs the result thereof to the output unit 4 (step A10).

Next, the advantages of the present exemplary embodiment will be described.

In the present exemplary embodiment, the configuration is such that notification and inquiry with respect to the dictionary data is executed only when the input data input to the natural-language processing means 21 includes a word that corresponds to the dictionary data to be registered.

Thus, the user judges the availability of only the dictionary data having a possibility of usage, along the context of the input data input by the user, whereby the judgment of presence or absence of need therefor is easy to perform. In addition, the user can judge the presence or absence of need for the dictionary data within a series of work executing the natural-language processing onto the input data input by the user, whereby the presence or absence of need for the dictionary data can be judged without hampering the action.

Figure 3:
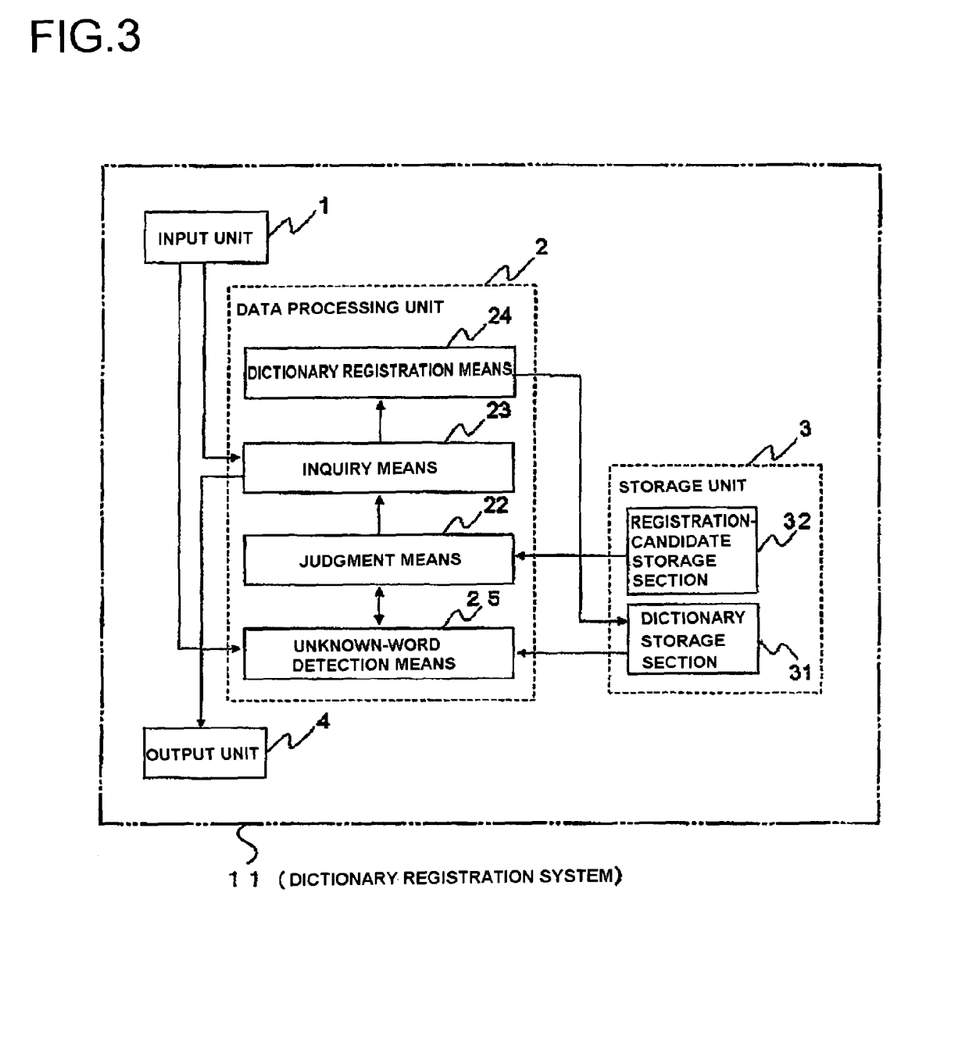
FIG. 3 is a block diagram showing the configuration of a dictionary registration system according to a second exemplary embodiment of the present invention.

Next, a dictionary registration system 11 according to a second exemplary embodiment of the present invention will be described in detail with reference to the drawings. Since the dictionary registration system 11 is configured by a portion of the natural-language processing system 10 that is needed to register the dictionary data in the dictionary, the description of parts thereof in common with the natural-language processing system 10 will be omitted here while denoting the same by the same reference numerals.

With reference to FIG. 3, the dictionary registration system 11 includes, instead of the natural-language processing means 21 of FIG. 1, an unknown-word retrieval means 25 that corresponds to the unknown-word detection function of the natural-language processing means 21.

The input data input from the input unit 1 is data such as a text that is prepared beforehand for the dictionary registration processing, instead of the data that is a target of the natural-language processing.

The output unit 4 is used only for inquiry of presence or absence of registration of the corresponding dictionary data, and for responding to the inquiry.

Next, a computer system 12 according to a third exemplary embodiment of the present invention will be described in detail with reference to the drawings.

Figure 4:
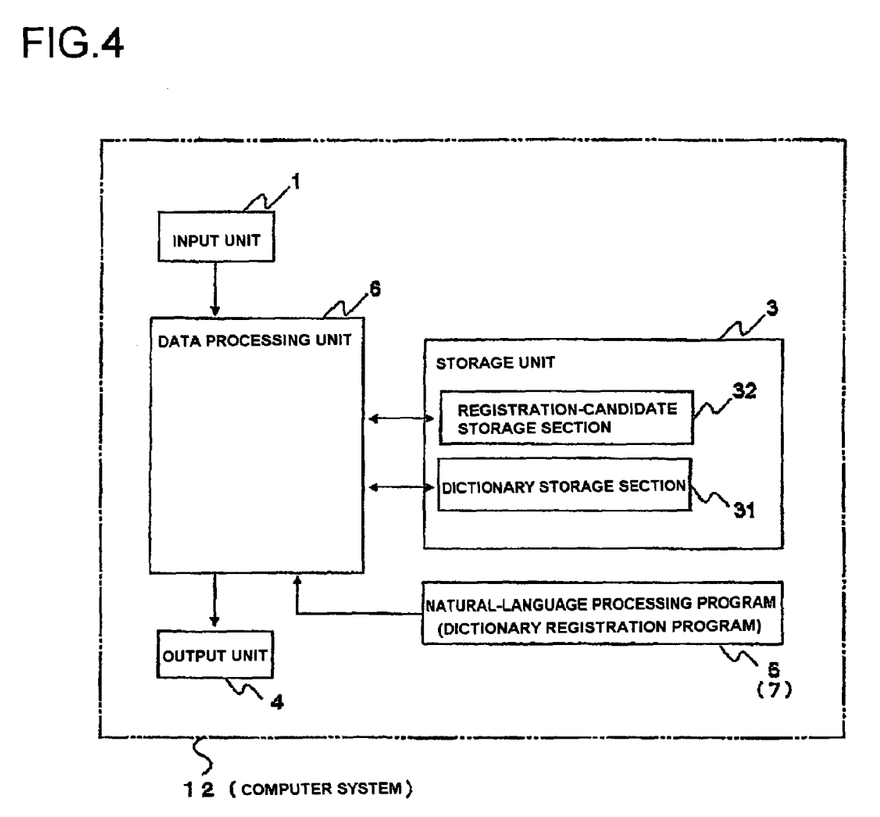
FIG. 4 is a block diagram showing the configuration of a computer system according to a third exemplary embodiment of the present invention.

With reference to FIG. 4, the computer system 12 includes an input unit 1, a data processing unit 6, a storage unit 3, and an output unit 4, similarly to the first exemplary embodiment of the present invention.

A natural-language processing program 5 is read into the data processing unit 6, controls operation of the data processing unit 6, and generates a dictionary storage section 31 and a registration-candidate storage section 32 in the storage unit 3. The data processing unit 6 executes the processing same as the processing by the data processing unit 2 in the first exemplary embodiment, due to the control of the natural-language processing retrieval program 5.

A dictionary-registration processing program 7 may be read into the data processing unit 6 instead of the natural-language-registration processing program 5, which executes the processing same as the processing by the data processing unit 2 in the second exemplary embodiment.

Next, a first example of the present invention will be described with reference to the drawings. This example corresponds to the first exemplary embodiment of the present invention. Hereinafter, a case will be assumed in particular where the natural-language processing means 21 performs a machine-translation processing.

The present example includes a keyboard as the input unit 1, a personal computer as the data processing unit 2, a magnetic-disk drive unit as the data storage unit 3, and a display as the output unit 4.

The personal computer includes the central processing unit functions as the natural-language processing means 21, judgment means 22, inquiry means 23, and dictionary registration means 24, and a storage area that functions as the dictionary storage section 31 and registration-candidate storage section 32 is secured in the magnetic-disk drive unit.

Figure 5:
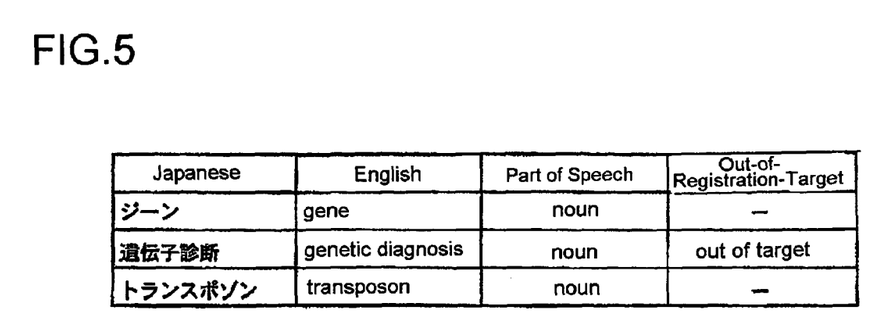
FIG. 5 is a diagram showing an example of the data structure in the registration-candidate storage section.

Here, a case is assumed where the dictionary data shown in FIG. 5 is stored as a registration candidate in the registration-candidate storage section 32. In FIG. 5, the contents of the dictionary data that configures the registration candidate is shown in a tabular form, wherein each row configures a single piece of the dictionary data. For example, the first row represents a piece of dictionary data including "gene" in Japanese, "gene" in English, and "nouns" in the section of speech. The fourth column thereof stores therein information that shows whether or not this dictionary data is out of the registration target. Here, "-" means that the inspection as to whether or not it is out of the registration target is not yet finished, whereas "out of target" means that it is the dictionary data specified in the past by an inspection that will be described later. More specifically, FIG. 5 shows that "gene" is not yet inspected, and that "genetic diagnosis" has a history of transmitting an inquiry as to presence or absence of need for registration thereof in the past and receiving an instruction that the registration is not needed as the result of the inquiry.

The processing in the present invention starts operation after the user inputs the input data to the natural-language processing means 21 as a target of processing. Here, a case is assumed where the user inputs as the input data a sentence "such a gene is referred to as transposon".

The central processing unit extracts, prior to performing a machine-translation processing to the input data, the dictionary data which configures a registration candidate from the registration-candidate storage section 32, to thereby inspect the contents thereof. For example, it is assured that the dictionary data of "genetic diagnosis" is out of registration target and that "gene" and "transposon" are unexamined candidates, by extracting the dictionary data from the registration-candidate storage section 32 shown in FIG. 5 and inspecting the column showing the out-of-registration-target.

Subsequently, the central processing unit compares the dictionary data which is input as an object of the natural-language processing against registration-candidate dictionary data that is extracted from the registration-candidate storage section 32, to detect that the input data includes the character string (corresponding word), "transposon" in this dictionary data. Thereafter, the central processing unit displays the dictionary data (corresponding dictionary data), "transposon", on the output unit 4, to inquire to the user whether or not it is to be registered.

Figure 6:
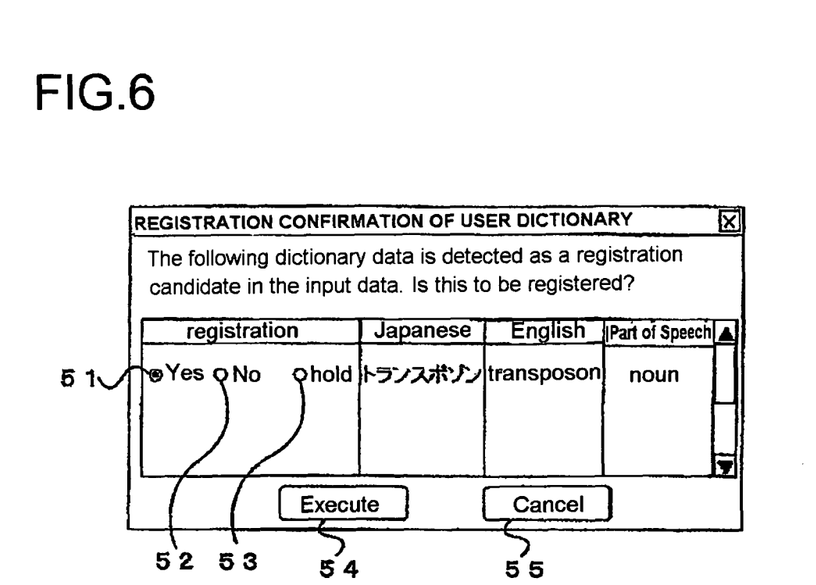
FIG. 6 is a diagram showing an example of the confirmation screen of registration of dictionary data.

FIG. 6 shows an example of the screen of an inquiry to the user. If the user marks on the radio button 51, "registering" of "transposon", and depresses "execution" button 54, the central processing unit registers the dictionary data, "transposon", in the dictionary, and deletes the dictionary data, "transposon", in the registration-candidate storage section 32. On the other hand, if the user marks on the radio button 52, "not registering", and depresses "execution" button 54, the central processing unit writes information showing that it is "out of target" in the column showing "out-of-registration-target" in the dictionary data, "transposon" in the registration-candidate storage section 32. If the user selects the radio button 53, "suspension", or "cancellation" button 55, neither the dictionary registration nor the renewal of registration-candidate storage section 32 is performed. Further, a "temporary use" button may be added, wherein the system operates so that the displayed dictionary data is not registered in the dictionary to use the same not as the permanent data, and is registered in a temporary dictionary to use the same only in the natural-language processing only onto the input data.

Figure 7:
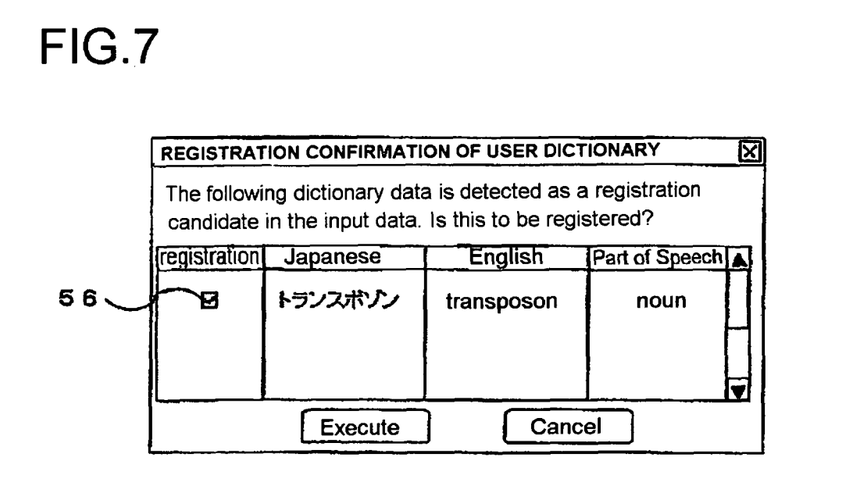
FIG. 7 is a diagram showing an example of the confirmation screen of registration of the dictionary data.

FIG. 6 shows an example that a radio button is used as the user interface that specifies whether or not the registration is to be performed; however, a check box 56 may be used, as shown in FIG. 7. In the case of FIG. 7, the configuration may be such that the dictionary data for which the check box 56 is marked is subjected to a processing similar to the processing executed in the case of selecting the radio button 51, "registering", whereas the dictionary data for which the check box is not marked is subjected to a processing similar to the processing executed in the case of selecting the radio button 52, "not registering", in FIG. 6.

Thereafter, the central processing unit executes a translation processing onto the input processing target, and outputs the result thereof to the output unit 4.

An example is presented that executes comparison of the input data against the dictionary data. However, the configuration may be such that the input data is first subjected to the natural-language processing, to detect that the "transposon" or part thereof is an unknown word, and thereafter inquires to the user whether or not the registration is to be performed, only when it is judged that the unknown word part overlaps the dictionary data, "transposon", extracted from the registration-candidate storage section 32.

According to the natural-language processing system of the present embodiment, since the notification and inquiry with respect to the dictionary data is executed only when the input data input to the natural-language processing means includes a word corresponding to the dictionary data to be registered, it is sufficient that the user judge, along the context of the input data input by the user, the availability of only the dictionary data having a possibility of usage by the user.

Accordingly, the user can judge with ease the presence or absence of the need for the individual dictionary data.

In addition, since the user can judge the presence or absence of need for the dictionary data within a series of work executing the natural-language processing with respect to the input data input by the user, notification and inquiry of presence or absence of need for registration can be executed without hampering the user's action.

In a natural-language processing system of an exemplary embodiment, the configuration may be such that the natural-language processing means has an unknown-word detection function that judges whether or not input data includes an unknown word, and if the natural-language processing means detects an unknown word included in the input data, the judgment means starts operation.

In a natural-language processing system of an exemplary embodiment, the configuration may be such that if the natural-language processing means detects an unknown word included in the input data, the judgment means compares a portion of the input data including the unknown word against the registration-candidate dictionary data, to judge whether or not there is a corresponding word in the portion including the unknown word.

According to the natural-language processing system of the above exemplary embodiment, since notification and inquiry with respect to the corresponding word included in the input data is executed only in a critical case where the input data includes an unknown word, the user can obtains the advantage of the dictionary registration of the unknown word only by responding to a less number of inquiries.

In a natural-language processing system of an exemplary embodiment, the natural-language processing means may be configured to execute a natural-language processing onto the input data by using only the dictionary data registered in the dictionary.

In a natural-language processing system of an exemplary embodiment, the natural-language processing means may be configured as a machine-translation means that converts a character string of a first language into a character string of a second language, or a voice-synthesis means that converts an input character string into an audio signal.

According to the natural-language processing system of the exemplary embodiment, since notification and inquiry with respect to the dictionary data is executed only when the input data input by the user includes a word corresponding to the dictionary data to be registered, it is sufficient that the user judge, along the context of the input data input by the user, the availability of only the dictionary data having a possibility of usage by the user.

Therefore, the user can judge with ease presence or absence of need for the individual dictionary data.

A dictionary registration system according to an exemplary embodiment may include an unknown-word detection means that judges whether or not the input data includes an unknown word, wherein the judgment means starts operation when the unknown-word detection means detects an unknown word included in the input data.

A dictionary registration system of an exemplary embodiment may be such that if the unknown-word detection means detects an unknown word included in the input data, the judgment means compares a portion of the input data including the unknown word against the registration-candidate dictionary data, to thereby judge whether or not there is a corresponding word included in the portion including the unknown word.

According to the above dictionary registration system, since notification and inquiry with respect to the corresponding word existing in the input data is executed only in a critical case where the input data includes an unknown word, the user can obtains the advantage of the dictionary registration of the unknown word in a maximum degree only by responding to a less number of inquiries.

In a dictionary registration system of an exemplary embodiment, the dictionary data may be dictionary data used in a machine-translation processing that converts a character string of a first language into another character string of a second language, or dictionary data used in a voice-synthesis processing that converts an input character string into an audio signal.

In a dictionary registration system of an exemplary embodiment, the dictionary data may be dictionary data used in a machine-translation processing that converts a character string of an input first language into another character string of a second language, dictionary data used in a kana-kanji conversion processing that converts an input kana character string into a kana-kanji-mixed character string, or dictionary data used in a speech-recognition processing that converts an input audio signal into a characteristic string, wherein the judgment means, upon comparing the input data against the registration-candidate dictionary data, may compare the input data against the character string that is stored in the registration-candidate dictionary data as the result of conversion to thereby judge whether or not there is a corresponding word.

According to the natural-language processing method of the exemplary embodiment, notification and inquiry with respect to the dictionary data is executed only when the input data input by the user includes a word corresponding to the dictionary data to be registered, whereby it is sufficient that the user judge, along the context of the input data input by the user, the availability of only the dictionary data having a possibility of usage by the user.

Therefore, the user can judge with ease presence or absence of need for the individual dictionary data.

In addition, since the user can judge the presence or absence of the need for the dictionary data within a series of work executing a natural-language processing onto the input data input by the user, notification and inquiry of presence or absence of need for the dictionary data can be executed without hampering the user's action.

A natural-language processing method of an exemplary embodiment may have a configuration wherein if it is judged that the input data includes an unknown word, upon judgment whether or not the input data includes an unknown word, the input data is compared against the registration-candidate dictionary data to thereby judge whether or not there is a corresponding word in the input data.

In a natural-language processing method of an exemplary embodiment, the configuration may be such that if it is judged that the input data includes an unknown word, a portion of the input data including the unknown word is compared against the registration-candidate dictionary data to thereby judge whether or not there is a corresponding word in the portion including the unknown word.

According to the natural-language processing method of the above exemplary embodiment, since notification and inquiry with respect to the corresponding word existing in the input data is executed only in a critical case where the input data includes an unknown word, the user can obtains the advantage of the dictionary registration of the unknown word only by responding to a less number of inquiries.

In a natural-language processing method of an exemplary embodiment, the natural-language processing may use only the dictionary data stored in the dictionary.

In a natural-language processing method of an exemplary embodiment, the natural-language processing may be a machine-translation processing that converts a character string of a first language into another characteristic string of a second language, or a voice-synthesis processing that converts an input character string into an audio signal.

According to the dictionary registration method of the exemplary embodiment, since notification and inquiry with respect to the dictionary data is executed only when the input data input by the user includes a corresponding word in the dictionary data to be registered, it is sufficient that the user judge, along the context of the input data input by the user, the availability of only the dictionary data having a possibility of usage by the user.

Therefore, the user can judge with ease presence or absence of need for the individual dictionary data.

A dictionary registration method of an exemplary embodiment may include judging whether or not there is an unknown word in the input data, and comparing the input data against the registration-candidate dictionary data, if it is judged that the input data includes an unknown word, to thereby judge whether or not there is a corresponding word in the input data.

A dictionary registration method of an exemplary embodiment may include comparing a portion of the input data including the unknown word against the registration-candidate dictionary data, if it is judged that the input data includes an unknown word, to judge whether or not the portion including the unknown word includes a corresponding word.

According to the dictionary registration method of the above exemplary embodiment, since notification and inquiry with respect to the corresponding word existing in the input data is executed only in a critical case where the input data includes an unknown word, the user can obtains the advantage of the dictionary registration of the unknown word in a maximum degree only by responding to a less number of inquiries.

In a dictionary registration method of an exemplary embodiment, the dictionary data may be dictionary data used in a machine-translation processing that converts a character string of a first language into another character string of a second language, or dictionary data used in a voice-synthesis processing that converts an input character string into an audio signal.

In a dictionary registration method of an exemplary embodiment, the dictionary data may be dictionary data used in a machine-translation processing that converts a character string of a first language into another character string of a second language, dictionary data used in a kana-kanji conversion processing that converts an input kana character string into a kana-kanji-mixed character string, or dictionary data used in a speech-recognition processing that converts an input audio signal into a characteristic string, wherein the comparing of the input data against the registration-candidate dictionary data compares the input data against the character string that is stored in registration-candidate dictionary data as the result of conversion, to thereby judge whether there is a corresponding word.

In a medium encoded with a natural-language processing program of an exemplary embodiment, the computer operates so that notification and inquiry with respect to the dictionary data is executed only when the input data input by the user includes a corresponding word in the dictionary data to be registered, whereby it is sufficient that the user judge the availability of only the dictionary data having a possibility of usage by the user along the context of the input data input by the user.

Thus, the user can judge with ease presence or absence of need for the individual dictionary data.

In addition, since the user can judge the presence or absence of the need for the dictionary data within a series of work executing a natural-language processing onto the input data input by the user, notification and inquiry of presence or absence of need for the dictionary data can be executed without hampering the user's action.

In a medium encoded with a natural-language processing program of an exemplary embodiment, the configuration may be such that the natural-language processing function includes a function of judging whether or not there is an unknown word in the input data, and if the natural-language processing function judges that the input data includes an unknown word, the computer is allowed to execute a judgment processing.

A medium encoded with a natural-language processing program of an exemplary embodiment may be such that if the natural-language processing function judges that the input data includes an unknown word, the judgment processing compares a portion of the input data including the unknown word against the registration-candidate dictionary data, to judge whether or not the portion including the unknown word includes a corresponding word.

According to the medium encoded with the natural-language processing program of the above exemplary embodiment, since notification and inquiry with respect to the corresponding word existing in the input data is executed only in a critical case where the input data includes an unknown word, the user can obtains the advantage of the dictionary registration of the unknown word in a maximum degree only by responding to a less number of inquiries.

In a medium encoded with a natural-language processing program of an exemplary embodiment, the natural-language processing function may use only the dictionary data registered in the dictionary to execute a natural-language processing.

In a medium encoded with a natural-language processing program of an exemplary embodiment, the natural-language processing function may be a machine-translation function that converts a character string of a first language into another character string of a second language, or a voice-synthesis function that converts an input character string into an audio signal.

According to the medium encoded with a dictionary registration program of the exemplary embodiment, the computer executes so that notification and inquiry with respect to the dictionary data is executed only when the input data input by the user includes a word corresponding to the dictionary data to be registered, whereby it is sufficient that the user judge, along the context of the input data input by the user, the availability of only the dictionary data having a possibility of usage by the user.

Thus, the user can judge with ease the availability of the individual dictionary data.

In a medium encoded with a dictionary registration program of an exemplary embodiment, the configuration may be such that causes the computer to execute an unknown-word detection processing that judges whether or not the input data includes an unknown word, and a judgment processing if the unknown-word detection processing judges that the input data includes an unknown word.

In a medium encoded with a dictionary registration program of an exemplary embodiment, the configuration may be such that if the natural-language processing detects an unknown word included in the input data, the judgment processing compares a portion of the input data including the unknown word against the registration-candidate dictionary data, to judge whether or not there is a corresponding word in the portion including the unknown word.

According to the medium encoded with a dictionary registration program of the above exemplary embodiment, since notification and inquiry with respect to the corresponding word included in the input data is executed only in a critical case where the input data includes an unknown word, the user can obtains the advantage of the dictionary registration of the unknown word only by responding to a less number of inquiries.

In a medium encoded with a dictionary registration program of an exemplary embodiment, the dictionary data may be dictionary data used in machine-translation processing that converts a character string of a first language into another character string of a second language, or dictionary data used in a voice-synthesis processing that converts an input character string into an audio signal.

In a medium encoded with a dictionary registration system of an exemplary embodiment, the dictionary data may be dictionary data used in a machine-translation processing that converts a character string of a first language into another character string of a second language, dictionary data used in a kana-kanji conversion processing that converts an input kana character string into a kana-kanji-mixed character string, or dictionary data used in a speech-recognition processing that converts an input audio signal into a characteristic string, wherein the comparing of the input data against the registration-candidate dictionary data compares the input data against the character string that is stored in registration-candidate dictionary data as the result of conversion, to thereby judge whether or not there is a corresponding word.

As described heretofore, a first advantage of a preferred embodiment of the present invention is that the user can judge with ease presence or absence of need for the individual dictionary data. This is because notification and inquiry with respect to the dictionary data is executed only when the input data input by the user into the natural-language processing means includes a word corresponding to the dictionary data which is to be registered. This allows the user to judge, along the context of the input data input by the user. the availability of only the dictionary data having a possibility of usage by the user.

A second advantage is that notification and inquiry of presence or absence of need for the dictionary data can be executed without hampering the user's action. This is because notification and inquiry is executed only when the input data input by the user into the natural-language processing means includes dictionary data which is to be registered. This allows the user to judge presence or absence of need for the dictionary data within a series of work executing a natural-language processing onto the input data input by the user.

The present invention is applicable to a program that achieves in a computer a machine-translation apparatus that converts a character string of a first language into another character string of a second language, and a voice-synthesis apparatus that converts an input character string into an audio signal.

In the above example, a configuration is exemplified wherein the operation is started when the user inputs data as a target of the natural-language processing. However, it is also applicable to a program for achieving on a computer a dictionary-preparation-assist apparatus that assists preparation of a dictionary used in a natural-language processing by employing a configuration wherein the operation is started by input of data that is not a direct target of the natural-language processing, such as a document having a possibility of configuring a target of the natural-language processing in the future. In addition, it is applicable to a program in the future for achieving on a computer a dictionary-preparation-assist apparatus used in a natural-language processing, such as machine-translation processing, kana-kanji conversion processing and speech-recognition processing, by employing a configuration wherein the operation is started by inputting a document to be obtained as a result of a natural-language processing to compare the input data against the character string that is stored in the dictionary data as a result of the natural-language processing.

This application is based upon and claims the benefit of priority from Japanese patent application No. 2006-242519 filed on Sep. 7, 2006, the disclosure of which is incorporated herein in its entirety by reference.

The invention claimed is:

1. A natural-language processing system that executes a natural-language processing onto input data, comprising:
   an input section that receives the input data;
   a dictionary storage section that stores therein one or more user dictionaries, each of the one or more user dictionaries including a plurality of dictionary data, wherein each dictionary data comprises a word and linguistic information associated with the word;
   a registration-candidate storage section that stores therein one or more registration-candidate dictionary data, wherein the one or more registration-candidate dictionary data are stored in the registration-candidate storage section prior to the input data being received by the input section, and wherein each registration-candidate dictionary data is a candidate of dictionary data to be newly registered in the one or more user dictionaries stored in the dictionary storage section;
   a judgment section that compares the input data against the registration-candidate dictionary data stored in the registration-candidate storage section to determine whether or not the input data includes a word corresponding to award in the registration-candidate dictionary data;
   an inquiry section that, in response to (i) detecting that the input data contains an unknown word which does not exist in the user dictionaries stored in the dictionary storage section and (ii) determining that the unknown word in the input data corresponds to a corresponding word in the registration-candidate dictionary data stored in the registration-candidate storage section, inquires to a user Whether or not the corresponding word in the registration-candidate dictionary data is to he registered in the user dictionaries stored in the dictionary storage section, and accepts a user's instruction;
   a dictionary registration section that registers the corresponding word in the registration-candidate dictionary data to the user dictionaries stored in the dictionary storage section based on the instruction input to the inquiry section; and
   a natural-language processing section that executes a natural-language processing onto the input data by using the dictionary data including the corresponding word in the registration-candidate dictionary data when said dictionary registration section registers the corresponding word in the registration-candidate dictionary data, and executes a natural-language processing onto the input data by using the dictionary data that does not include the corresponding word in the registration-candidate dictionary data when said dictionary registration section does not register the corresponding word in the registration-candidate dictionary data, wherein when the inquiry section accepts an instruction input from the user that the user does not make registration, the inquiry section registers, in said registration-candidate storage section, the corresponding word in the registration-candidate dictionary data as well as information that the user has indicated that the corresponding word in the registration-candidate dictionary data is not needed and out of the registration target, and the dictionary registration section skips to register, in the dictionary storage section, the corresponding word in the registration-candidate dictionary data that is stored with the information that the corresponding word in the registration-candidate dictionary data is out of the registration target, and wherein when the inquiry section accepts an instruction input from the user that the user temporarily uses the corresponding word in the registration-candidate dictionary data, the inquiry section registers the corresponding word in the registration-candidate dictionary data in a temporary dictionary, and the natural-language processing section executes a natural-language processing onto the input data by using either the dictionary data registered in the dictionary storage section or the dictionary data registered in the temporary dictionary.

2. The natural-language processing system according to claim 1, wherein:
said natural-language processing section comprises an unknown-word detection function that detects the unknown word included in the input data; and
said judgment section starts operation when said natural-language processing section detects the unknown word included in the input data.

3. The natural-language processing system according to claim 2, wherein said judgment section compares a portion of the input data including the unknown word against the registration-candidate dictionary data to determine whether or not the corresponding word exists in said portion including the unknown word, when said natural-language processing section detects the unknown word included in the input data.

4. The natural-language processing system according to claim 1, wherein said natural-language processing section executes the natural-language processing onto the input data by using only the dictionary data registered in said dictionary storage section.

5. The natural-language processing system according to claim 1, wherein said natural-language processing section comprises a machine-translation section that converts a character string of a first language into another character string of a second language, and/or a voice-synthesis section that converts an input character string into an audio signal.

6. The dictionary registration according to claim 1, wherein:
the dictionary data includes dictionary data used in a machine-translation processing that converts a character string of an input first language into another character string of a second language, dictionary data used in a kana-kanji conversion processing that converts an input kana character string into a kana-kanji-mixed character string, and/or dictionary data used in a speech-recognition processing that converts an input audio signal into a character string; and
said judgment section compares, upon comparing the input data against the registration-candidate dictionary data, the input data against a character string of the registration-candidate data that is stored in said registration-candidate storage section as a result of conversion result to determine whether or not the corresponding word exists.

7. The natural-language processing system according to claim 1, wherein the one or more registration-candidate dictionary data include dictionary data that are registered in common in a plurality of user dictionaries other than the one or more user dictionaries stored in the dictionary storage section.

8. A dictionary registration system comprising:
an input section that receives input data;
a dictionary storage section that stores therein one or more user dictionaries, each of the one or more user dictionaries including a plurality of dictionary data, wherein each dictionary data comprises a word and linguistic information associated with the word;
a registration-candidate storage section that stores therein one or more registration-candidate dictionary data, wherein the one or more registration-candidate dictionary data are stored in the registration-candidate storage section prior to the input data being received by the input section, and wherein each registration-candidate dictionary data is a candidate of dictionary data to be newly registered in the one or more user dictionaries stored in the dictionary storage section;
a judgment section that compares the input data against the registration-candidate dictionary data stored in the registration-candidate storage section to determine whether or not the input data includes a word corresponding to a word in the registration-candidate dictionary data;
an inquiry section that, in response to (i) detecting that the input data contains an unknown word which does not exist in the user dictionaries stored in the dictionary storage section and (ii) determining that the unknown word in the input data corresponds to a corresponding word in the registration-candidate dictionary data stored in the registration-candidate storage section, inquires to a user whether or not the corresponding word in the registration-candidate dictionary data is to be registered in the user dictionaries stored in the dictionary storage section and accepts a user's instruction; and
a dictionary registration section that registers the corresponding word in the registration-candidate dictionary data to the user dictionaries stored in said dictionary storage section based on the instruction input to said inquiry section,
wherein when the inquiry section accepts an instruction input from the user that the user does not make registration, the inquiry section registers, in said registration-candidate storage section, the corresponding word in the registration-candidate dictionary data as well as information that the user has indicated that the corresponding word in the registration-candidate dictionary data is not needed and out of the registration target, and the dictionary registration section skips to register, in the dictionary storage section, the corresponding word in the registration-candidate dictionary data that is stored with the information that the corresponding word in the registration-candidate dictionary data is out of the registration target, and wherein when the inquiry section accepts an instruction input from the user that the user temporarily uses the corresponding word in the registration-candidate dictionary data, the inquiry section registers the corresponding word in the registration-candidate dictionary data in a temporary dictionary.

9. dictionary registration system according to claim 8, further comprising an unknown-word detection section that detects the unknown word included in the input data, wherein:

said judgment section starts operation when said unknown-word detection section detects the unknown word included in the input data.

10. The dictionary registration system according to claim 9, wherein, when said unknown-word detection section detects an unknown word included in the input data, said judgment section compares a portion of the input data including the unknown word against the registration-candidate dictionary data to determine whether or not the corresponding word exists in said portion including the unknown word.

11. A natural-language processing method comprising:
receiving input data;
detecting whether the input data contains an unknown word, wherein the unknown word is a word that does not exist in a dictionary;
comparing the input data against one or more registration-candidate dictionary data stored in a storage unit to determine whether or not the input data includes a word corresponding to a word in the registration-candidate dictionary data, wherein each registration-candidate dictionary data is a candidate of dictionary data to be newly registered in the dictionary, and wherein the one or more registration-candidate dictionary data are stored in the storage unit prior to receiving the input data;
in response to (i) detecting that the input data contains the unknown word which does not exist in the dictionary and (ii) determining that the unknown word in the input data corresponds to a corresponding word in the registration-candidate dictionary data stored in the storage unit, inquiring to a user whether or not the corresponding word in the registration-candidate dictionary data is to be registered in the dictionary and accepting a user's instruction;
registering the corresponding word in the registration-candidate dictionary data in the dictionary based on the input instruction; and
executing a natural-language processing onto the input data by using the dictionary data including the corresponding word in the registration-candidate dictionary data when the corresponding word in the registration-candidate dictionary data is registered, and executing a natural-language processing onto the input data by using the dictionary data that does not include the corresponding word in the registration-candidate dictionary data when the corresponding word in the registration-candidate dictionary data is not registered,
wherein when an instruction input is accepted from the user that the user does not make registration, registering the corresponding word in the registration-Candidate dictionary data as well as information that the user has indicated that the corresponding word in the registration-candidate dictionary data is not needed and out of the registration target, and skipping to register the corresponding word in the registration-candidate dictionary data that is stored with the information that the corresponding word in the registration-candidate dictionary data is out of the registration target, and
wherein when accepting an instruction input from the user that the user temporarily uses the corresponding word in the registration-candidate dictionary data, registering the corresponding word in the registration-candidate dictionary data in temporary dictionary, and executing a natural-language processing onto the input data by using either the dictionary data registered in the dictionary or the dictionary data registered in the temporary dictionary.

12. The natural-language processing method according to claim 11, further comprising:
comparing, upon judging that the corresponding word exists in the input data, a portion of the input data including the unknown word against the registration-candidate dictionary data to determine whether or not the corresponding word exists in the portion including the unknown word.

13. The natural-language processing method according to claim 11, wherein the natural-language processing uses only the dictionary data stored in the dictionary.

14. The natural-language processing method according to claim 11, wherein the natural-language processing includes a machine-translation processing that converts a character string of a first language into another character string of a second language, and/or a voice-synthesis processing that converts an input character string into an audio signal.

15. A dictionary registration method comprising:
receiving input data;
detecting whether the input data contains an unknown word, wherein the unknown word is a word that does not exist in a dictionary;
comparing the input data against one or more registration-candidate dictionary data stored in a storage unit to determine whether or not the input data includes a word corresponding to a word in the registration-candidate dictionary data, wherein each registration-candidate dictionary data is a candidate of dictionary data to be newly registered in the dictionary, and wherein the one or more registration-candidate dictionary data are stored in the storage unit prior to receiving the input data;
in response to (i) detecting that the input data contains the unknown word which does not exist in the dictionary and (ii) determining that the unknown word in the input data corresponds to a corresponding word in the registration-candidate dictionary data stored in the storage unit, inquiring to a user whether or not the corresponding word in the registration-candidate dictionary data is to be registered in the dictionary and accepting a user's instruction; and
registering the corresponding word in the registration-candidate dictionary data in the dictionary based on the input instruction,
wherein when an instruction input is accepted from the user that the user does not make registration, registering the corresponding word in the registration-candidate dictionary data as well as information that the user has indicated that the corresponding word in the registration-candidate dictionary data is not needed and out of the registration target, and skipping to register the corresponding word in the registration-candidate dictionary data that is stored with the information that the corresponding word in the registration-candidate dictionary data is out of the registration target, and wherein when accepting an instruction input from the user that the user temporarily uses the corresponding word in the registration-candidate dictionary data, registering the corresponding word in the registration-candidate dictionary data in a temporary dictionary, and executing a natural-language processing onto the input data by using either the dictionary data registered in the dictionary or the dictionary data registered in the temporary dictionary.

16. The dictionary registration method according to claim 15, further comprising:

comparing a portion of the input data including the unknown word against the registration-candidate dictionary data to determine whether or not the corresponding word exists in said portion including the unknown word, when the input data includes the unknown word.

17. The dictionary registration method according to claim 15, wherein the dictionary data includes dictionary data used in a machine-translation processing that converts a character string of an input first language into another character string of a second language, and/or dictionary data used in a voice-synthesis processing that converts an input character string into an audio signal.

18. The dictionary registration method according to claim 15, wherein:

the dictionary data includes dictionary data used in a machine-translation processing that converts a character string of an input first language into another character string of a second language, dictionary data used in a kana-kanji conversion processing that converts an input kana character string into a kana-kanji-mixed character string, and/or dictionary data used in a speech-recognition processing that converts an input audio signal into a character string; and said comparing of the input data against the registration-candidate-dictionary data compares the input data against a character string that is stored in the registration-candidate dictionary data as a result of conversion result to determine whether or not the corresponding word exists.

19. A non-transitory recording medium encoded with a computer-readable program that is configured to cause a central processing unit (CPU) to operate, said program causes said CPU to execute the processing of:

storing or more registration-candidate dictionary data in a storage unit, wherein each registration-candidate dictionary data is a candidate of dictionary data to be newly registered in a dictionary, and wherein the one or more registration-candidate dictionary data are stored in the storage unit prior to receiving input data;

receiving the input data;

detecting whether the input data contains an unknown word, wherein the unknown word is a word that does not exist in the dictionary;

comparing the input data against the registration-candidate dictionary data stored in the storage unit to determine whether or not the input data includes a word corresponding to a word in the registration-candidate dictionary data;

in response to (i) detecting that the input data contains the unknown word which does not exist in the dictionary and (ii) determining that the unknown word in the input data corresponds to a corresponding word in the registration-candidate dictionary data stored in the storage unit, inquiring to a user whether or not the corresponding word in the registration-candidate dictionary data is to be registered in the dictionary and accepting a user's instruction;

registering the corresponding word in the registration-candidate dictionary data in the dictionary based on an instruction input in said inquiring processing;

executing a natural-language processing onto the input data by using the dictionary data including the corresponding word in the registration-candidate dictionary data when the corresponding word in the registration-candidate dictionary data is registered, and executing a natural-language processing onto the input data by using the dictionary data that does not include the corresponding word in the registration-candidate dictionary data when the corresponding word in the registration-candidate dictionary data is not registered, wherein when an instruction input is accepted from the user that the user does not make registration, registering the corresponding word in the registration-candidate dictionary data as well as information that the user has indicated that the corresponding word in the registration-candidate dictionary data is not needed and out of the registration target, and skipping to register the corresponding word in the registration-candidate dictionary data that is stored with the information that the corresponding word in the registration-candidate dictionary data is out of the registration target, and wherein when accepting an instruction input from the use that the user temporarily uses the corresponding word in the registration-candidate dictionary data, registering the corresponding word in the registration-candidate dictionary data in a temporary dictionary, and executing a natural-language processing onto the input data by using either the dictionary data registered in the dictionary or the dictionary data registered in the temporary dictionary.

20. The non-transitory medium according to claim 19, wherein:

said program causes said CPU to execute said processing of determining whether or not the input data includes a word corresponding to a word in the registration-candidate dictionary data, when the unknown word exists in the input data.

21. The non-transitory medium according to claim 20, said processing compares a portion of the input data including the unknown word against the registration-candidate dictionary data to determine whether or not the corresponding word exists in said portion including the unknown word, when the unknown word exists in the input data.

22. The non-transitory medium according to claim 19, wherein the natural-language processing executes the natural-language processing onto the input data by using only the dictionary data stored in the dictionary.

23. The non-transitory medium according to claim 19, wherein the natural-language processing has a machine-translation function that converts a character string of a first language into another character string of a second language, and/or a voice-synthesis function that converts an input character string into an audio signal.

24. A non-transitory recording medium encoded with a computer-readable program that is configured to cause a central processing unit (CPU) to operate, said program causes said CPU to execute the processing of:

storing one or more registration-candidate dictionary data in a storage unit, wherein each registration-candidate dictionary data is a candidate of dictionary data to be newly registered in a dictionary, and wherein the one or more registration-candidate dictionary data are stored in the storage unit prior to receiving input data;

receiving the input data;

detecting whether the input data contains an unknown word, wherein the unknown word is a word that does not exist in the dictionary;

comparing the input data against the registration-candidate dictionary data stored in the storage unit to determine whether or not the input data includes a word corresponding to a word in the registration-candidate dictionary data;

in response to (i) detecting that the input data contains the unknown word which does not exist in the dictionary and (ii) determining that the unknown word in the input data corresponds to a corresponding word in the registration-candidate dictionary data stored in the storage unit, inquiring to a user whether or not the corresponding word in the registration-candidate dictionary data is to he registered in the dictionary and accepting a user's instruction; and registering the corresponding word in the registration-candidate dictionary data in the dictionary based on an instruction input in said inquiry processing, wherein when an instruction input is accepted from the user that the user does not make registration, registering the corresponding word in the registration-candidate dictionary data as well as information that the user has indicated that the corresponding word in the registration-candidate dictionary data is not needed and out of the registration target, and skipping to register the corresponding word in the registration-candidate dictionary data that is stored with the information that the corresponding word in the registration-candidate dictionary data is out of the registration target, and wherein when accepting an instruction input from the user that the user temporarily uses the corresponding word in the registration-candidate dictionary data, registering the corresponding word in the registration-candidate dictionary data in a temporary dictionary, and executing a natural-language processing onto the input data by using either the dictionary data registered in the dictionary or the dictionary data registered in the temporary dictionary.

25. The non-transitory medium according to claim 24, wherein:

said program causes said CPU to execute said processing of determining whether or not the input data includes a word corresponding to a word in the registration-candidate dictionary data, detecting that the unknown word is included in the input data.

26. The non-transitory medium according to claim 25, wherein, when detecting that the unknown word is included in the input data, said processing compares a portion of the input data including the unknown word against the registration-candidate dictionary data to judge whether or not the corresponding word exists in said portion including the unknown word.

27. The non-transitory medium according to claim 24, wherein the dictionary data includes dictionary data used in a machine-translation function that converts a character string of an input first language into another character string of a second language, and/or dictionary data used in a voice-synthesis function that converts an input character string into an audio signal.

28. The non-transitory medium according to claim 24, wherein:

the dictionary data includes dictionary data used in a machine-translation function that converts a character string of an input first language into another character string of a second language, dictionary data used in a kana-kanji conversion function that converts an input kana character string into a kana-kanji-mixed character string, and/or dictionary data used in a speech recognition function that converts an input audio signal into a character string; and wherein said processing compares, upon comparing the input data against the registration-candidate dictionary data, the input data against the registration-candidate dictionary data that is stored in the registration-candidate dictionary data as a result of conversion result to determine whether or not the corresponding word exists.

* * * * *